United States Patent [19]
Melnik

[11] 3,925,898
[45] Dec. 16, 1975

[54] RULER-BEAM

[76] Inventor: George Melnik, 907 Nottingham Road, Newark, Del. 19711

[22] Filed: July 29, 1974

[21] Appl. No.: 492,435

[52] U.S. Cl. ................................. 33/27 C; 33/158
[51] Int. Cl.² ........................................ B43L 9/04
[58] Field of Search .......... 33/27 C, 27 R, 158–160

[56] References Cited
UNITED STATES PATENTS

| | | | |
|---|---|---|---|
| 760,353 | 5/1904 | Stone | 33/158 |
| 1,453,876 | 5/1923 | Hunter | 33/143 M |
| 1,653,016 | 12/1927 | Mellor | 33/158 X |
| 1,670,509 | 5/1928 | Jung | 33/158 |
| 2,423,779 | 7/1947 | Kahn | 33/107 R |
| 3,378,879 | 4/1968 | Stall | 16/93 D |

FOREIGN PATENTS OR APPLICATIONS

| | | | |
|---|---|---|---|
| 481,619 | 1/1970 | Switzerland | 16/93 D |
| 378,486 | 7/1964 | Switzerland | 16/93 D |
| 51,213 | 12/1911 | Austria | 33/158 |

*Primary Examiner*—Harry N. Haroian

[57] ABSTRACT

A beam compass consisting of a rectangular channel-shaped beam with circular bulb-shaped edges, designed to engage two parallel circular grooves on flat disc-shaped sliders. This type of design provides utmost precision and accuracy in a beam compass without the necessity of auxillary apertances such as threaded locking nuts, leaf springs, wheels or thumb nuts.

1 Claim, 6 Drawing Figures

U.S. Patent  Dec. 16, 1975  3,925,898
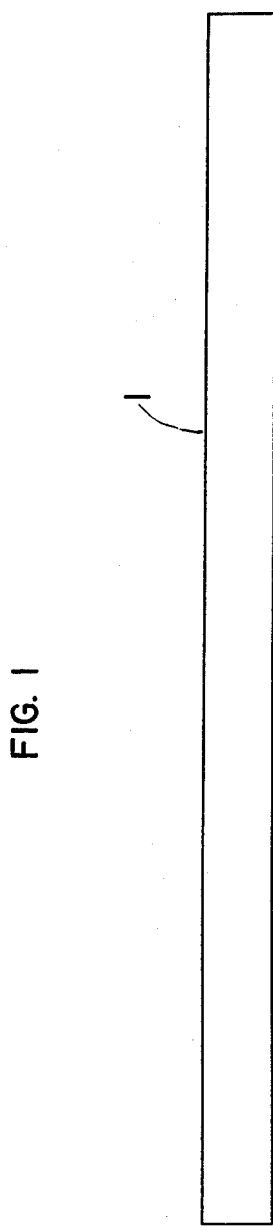
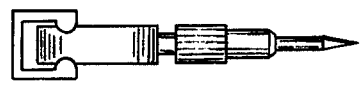
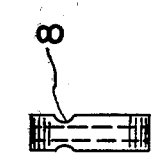
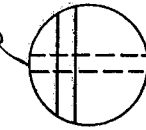
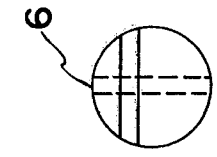
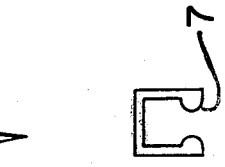

RULER-BEAM

This invention relates to drafting instruments and more particularly to an instrument that is adapted to perform functions other than a compass.

This invention can be used as a ruler to measure distance, a beam compass to draw circles or a circular cutter to cut gaskets from paper, film, cork, plastic, leather, rubber and other similar lightweight materials.

Rulers are customarily used by students, secretaries, office workers, craftsmen; beam compasses by draftsmen, designers, engineers, carpenters, surveyors; gasket cutters by industrial firms, illustrators, artists.

The standard beam compass comprises a fixed pivot point and a moveable scribing point; in some cases, both are moveable and may be positioned along the longitudinal axis of the beam. In most cases, rigidity of the moving slider is maintained by spring action of the slider, or a separate internal leaf spring mounted within the slider acting on a solid bar or beam. Locking screws may or may not be incorporated to secure the slider to the beam once a radius has been established. Usually a thumb nut is rotated to move the slider along the beam.

Such a spring loaded adjustment may often prove inaccurate because the scribing point holders are never rigid to the beam during traverse along the beam. When the fingers push the point holder or a thumb nut, the internal leaf spring must deflect slightly. In so doing, the entire unit, slider, holder and the scribing point must naturally shift from a perpendicular to the beam's axis. On release of the fingers, the point will assume a position other than desired.

It is a primary object of this invention to provide a new and improved beam compass, one in which the point holder maintains complete rigidity with no apparent displacement of distance of the point relative to the beam's axis, after release of the fingers from the point holder or slider.

Another object of the invention is to provide a beam compass wherein the slider is so designed that it rides on only one side of the beam and maintains constant contact to the beam. The currently available commercial devices designed for use in scribing circles has the beam passing through the slider.

Utilizing only one side of the beam for the slider offers an advantage not possible with other make compasses. The free sides can be used for attaching scales. By turning the compass on one of the free sides, a radius can be measured on a drawing or the scale can be used to measure distance on a drawing.

It is a further object of this invention to provide a new and improved beam compass adpated to be used with a cutter blade so that cut-outs can be made from lightweight material as mentioned above. The cutter blade would have a shaft diameter equal to that of the pivot needle or lead, and the cutting end would have a chisel edge.

Another object of this invention is to provide a new and improved beam compass wherein the hollow of the beam provides room for a tubular capsule which can be used to hold additional points and leads. The storage capsule can be inserted in either end of the beam.

Another object of this invention and probably the most important, is to provide simplicity in manufacturing. By reducing to a minimum the number of parts in the assembly, this compass becomes an ideal low-cost production unit. It can be seen from the design illustrated there are no thumb nuts, screws, inner leaf springs or nuts to secure a slider to the beam.

These and other objects of my invention will appear from the following description, made in conjunction with the attached drawing. Reference characters in the description refer to the same throughout the several views in which:

FIG. 1 is a plan or top view of my beam compass.

FIG. 2 is a side view showing two sliders mounted on the lower face of the beam. One slider contains a pivot needle or point about which a circle can be scribed, while the other slider contains a pencil point or cutter blade which does the scribing or cutting. All of these points are interchangeable since the holders in both are identical, and the shaft diameters of the needle, pencil point and the cutter blade are identical.

FIG. 3 is an end view of the compass.

FIG. 4 is an end view of the channel-shaped beam, showing the hollow and the bulb-shaped legs which engages the cavities on the sides of the slider.

FIG. 5 is a side view of the slider.

FIG. 6 is an end view of the slider.

Referring now to FIG. 2, it will be observed that the sliders 2 can move the length of the beam 1. This is particularly important when small circles are required. Having both sliders 2 near the center of the beam 1 for small circles makes circle scribing easier to perform. Mounting of the sliders 2 to the beam 1 can be from either end.

FIG. 4 shows that the channel-shaped beam 1 has a hollow interior and a slitted bottom with bulb-shaped ends extending inwardly from the parallel side walls for the full length of the beam. Purpose of the bulb-shaped ends 7 is to provide as large a surface as possible for contact with the sliders 2. The contour prevents the sliders 2 from swaying. For the sliders to enter the beam 1, the bulb-shaped ends must spread. In other-words, an interference fit is present. Spreading of the legs creates a compressive force against the sliders 2. This force acts for the full length of the beam 1.

During movement of the sliders 2 along beam 1, rigidity is maintained at all times. There is no possible sway or loose fit at any time. The slider is pushed with the thumb to the position desired. Only light pressure is required to position the sliders 2.

The slider 2, FIG. 5, is a one piece part with a low coefficient of friction. It is circular in shape, but could be oval, too. It has two parallel grooves, whose curvature matches that of the bulb-shaped legs of beam 1. Passing through the center of the slider 2 and perpendicular to the side grooves, is a hole 6 for the point holder assembly.

The point holder assembly is a standard unit consisting of only two parts. One part is a tubular sleeve 5. It has a threaded section about mid-point and a slit in the end that accepts the needle or lead. The slit is on the diameter so as to form two equal legs about ¼ inch long. The other part of the point holder assembly is a locking nut 3 with an internal thread on one end and a tapered hole on the other end (needle or lead end).

The tubular sleeve 5 is inserted in the hole of the slider 2. The slitted end extends below the slider 2.

After the lead, needle or cutter blade is inserted between the slits of tubular sleeve 5, the locking nut 3 is tightened. This causes the internal taper at the bottom of the locking nut 3 to compress the split legs of the tubular sleeve 5 against the needle, lead or cutter blade.

In the illustrated embodiment of this invention, the beam 1 is a generally elongated channel-shaped member. The cross-section can be a rectangular channel (illustrated) which provides three free sides, triangular, circular or oval, or a polygon of five sides or more. In either case, one side would be cut through and the ends would have the bulb-shape configuration similar to the legs 7 of FIG. 4.

This invention provides a ruler-beam compass-gasket cutter whose pivot and scribing points may be rapidly and accurately positioned to any given radius.

Also, it can be observed that having a slider 2 ride on one wall, the two upper edges of beam 1 can be used as a straight edge for drawing lines. This is not possible where a beam passes through a slider.

The foregoing detailed description has been given for the clearness of understanding only. It will, of course, be understood that various changes may be made in the details, size of parts, selection of material, without departing from the scope of my invention as set forth in the following listed claims.

What is to be claimed:

1. A beam compass comprising an elongated beam having an elongated top wall and elongated downwardly extending substantially parallel side walls forming a beam of substantially C-shape in cross-section, the free ends of said walls having inwardly extending bulb shaped projections formed along the entire length thereof; a pair of identical sliders, formed of low friction material, each having elongated grooves receiving said leg projections in intimate surface to surface contact; the distance between said leg projections being less than the distance between the grooves such that an interference fit is formed therebetween; each said slider having means extending therethrough at right angles to the direction of the groove for receiving a point and scriber holders, a point holder and a scriber holder mounted in said means; said interference fit allowing said slider to be adjusted along said beam by a force applied by the thumb and to remain securely in the adjusted position for describing arcs.

* * * * *